United States Patent [19]

Macovski

[11] Patent Number: 4,827,528
[45] Date of Patent: May 2, 1989

[54] ERROR-MINIMIZING NOISE-REDUCTION SYSTEM

[75] Inventor: Albert Macovski, Menlo Park, Calif.

[73] Assignee: Stanford University, Stanford, Calif.

[21] Appl. No.: 798,745

[22] Filed: Nov. 15, 1985

[51] Int. Cl.⁴ .......................... G06K 9/00; H04N 7/18
[52] U.S. Cl. ...................................... 382/6; 324/309;
358/36; 358/111; 358/167; 382/54; 364/413.13
[58] Field of Search ...................... 382/54, 6; 358/111,
358/167, 36; 324/309, 312

[56] References Cited

U.S. PATENT DOCUMENTS

| | | | |
|---|---|---|---|
| 4,330,833 | 5/1982 | Pratt | 358/167 |
| 4,463,375 | 7/1984 | Macouski | 364/414 |
| 4,463,381 | 7/1984 | Powell | 358/167 |
| 4,486,708 | 12/1984 | Macouski | 324/309 |
| 4,499,493 | 2/1985 | Nishimura | 358/111 |
| 4,503,461 | 3/1985 | Nishimura | 358/111 |
| 4,626,894 | 12/1986 | Harwood | 358/36 |
| 4,709,395 | 11/1987 | Fischer | 382/54 |

Primary Examiner—Leo H. Boudreau
Attorney, Agent, or Firm—Flehr, Hohbach, Test, Albritton & Herbert

[57] ABSTRACT

In a multiple-measurement system, a weighted sum of the measurements is used to provide a selective image. An additional weighted sum is used to provide an increased signal-to-noise ratio image. An improved selective image is formed by combining the low frequency portions of the selective image and the correct high frequency components from the increased signal-to-noise ratio image. To provide the correct high frequency components the error between the selective image and the improved selective image is minimized. The low-noise high-frequency image is weighted by the ratio of the cross correlation of the selective and low noise images divided by the autocorrelation of the low noise image.

12 Claims, 1 Drawing Sheet

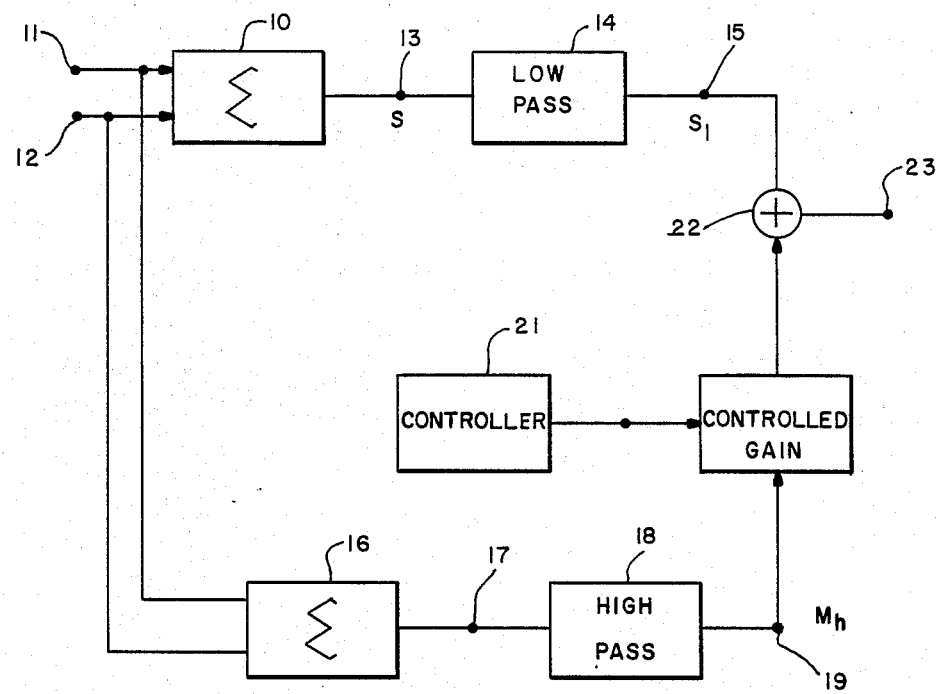
FIG.—1
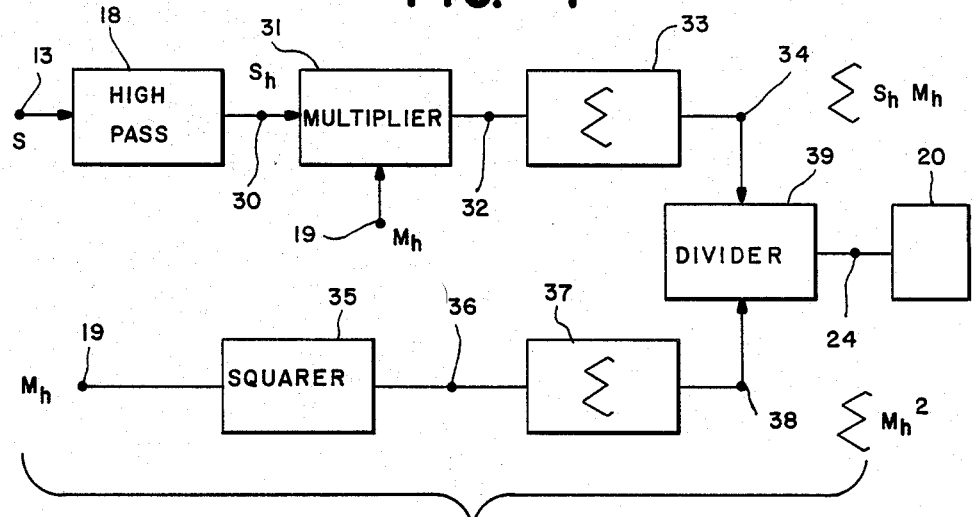
FIG.—2
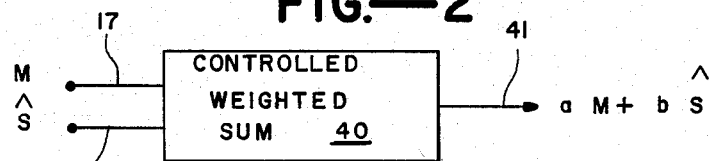
FIG.—3

ERROR-MINIMIZING NOISE-REDUCTION SYSTEM

The U.S. Government has rights in the invention described and claimed herein pursuant to National Science Foundation Grant No. ECS 82-13959-A1.

BACKGROUND OF THE INVENTION

1. Field of the Invention

This invention relates to imaging systems. In a primary application of the invention relates to the processing of multicomponent x-ray and magnetic resonance images.

2. Description of Prior Art

In many branches of imaging an array of image measurements are combined to provide a desired selective image. This is particularly true in medical imaging where x-ray or magnetic resonance measurements can be combined to emphasize or cancel specific body materials, significantly improving the diagnosis. This process is described in a paper by A. Macovski in the IEEE Trans. on Medical Imaging., MI-1: 42 (1982), entitled "Selective Projection Imaging: Application to Radiography and NMR."

A problem with this selective operation is the reduced SNR. The elimination of certain materials requires that negative weights by applied to some of the measurements. This reduces the mean values, while the variances add, thus reducing the SNR. This problem was significantly improved by the system of U.S. Pat. No. 4,463,375 issued to Albert Macovski. Here the measurements are combined to provide both the desired selective image, and a nonselective low-noise image where the weights are all positive. The final processed selective image is then derived from the low-frequency portion of the selective image and high frequency information from the low-noise image. In the latter operation, care must be taken that only the desired high frequency information, of the correct amplitude and polarity, is chosen. In the patent cited, one method of providing the correct high frequency information was to weight the high frequency image by the ratio of the derivatives of the selective and low-noise signals. This, however, produces some instabilities and can require the use of threshold devices to limit the range of operation.

As indicated in U.S. Pat. No. 4,463,375, a primary application is dualenergy radiography and computerized tomography. These systems can also be applied to multiple component NMR images including cross-sectional images and selective projection images as described in U.S. Pat. No. 4,486,708.

SUMMARY OF THE INVENTION

An object of this invention is to provide a system for improving the signal-to-noise ratio in images derived from a plurality of measurements.

A further object of this invention is to improve the signal-to-noise ratio of material-selective x-ray and magnetic resonance cross-sectional and projection images.

A further object of this invention is to provide a stable means of processing the images for improved signal-to-noise ratio which is wellbehaved and does not exhibit excessive gain.

Briefly, in accordance with the invention, an array of measurements are taken of an object under different conditions. These are combined to provide a selective image. The same measurements are combined in a different fashion to provide a low-noise image. An improved selective image is provided by adding the low frequencies of the selective image to a controlled amount of the high frequencies of the low-noise image. The control function minimizes the error between the selective image and the improved selective image. A preferred embodiment of the control function is the ratio of the cross correlation of the selective image and the low noise image divided by the autocorrelation of the low noise image.

BRIEF DESCRIPTION OF THE DRAWINGS

For a more complete disclosure of the invention, reference may be made to the following detailed description of several illustrative embodiments thereof which is given in conjunction with the accompanying drawings, of which:

FIG. 1 is a block diagram of an embodiment of the invention;

FIG. 2 is a block diagram of an embodiment of the controller used in the invention; and FIG. 3 is a processor used to select the desired image.

DESCRIPTION OF THE PREFERRED EMBODIMENT

A basic block diagram of the invention is given in FIG. 1. As shown, image measurements, or preprocessed measurements of projection images or cross-sectional images for example, 11 and 12 are being processed to provide a selective image of improved SNR. Although only two image measurements, 11 and 12, are shown, this is exemplary. In many imaging systems, such as magnetic resonance, a large number of image measurements can be used including those relating to density and relaxation times of each of a large number of spectral components.

As indicated, 11 and 12 can be preprocessed measurements rather then the direct measurements themselves. For example, when applied to dual energy systems, 11 and 12 can be the equivalent aluminum and plastic image signals from which other selective images are created.

As described in the previously referred to U.S. patent, the signals are combined in weighted adder 10 to form selective image signal 13. The weights for each signal in adder 10 usually are both positive and negative. Selective signal 13 is then low-pass filtered in 14, a two-dimensional low pass filter such as the sum of 5×5 array of pixels.

The same 11 and 12 are also supplied to weighted adder 16 where the image signals are combined so as to provide signal 17 having a relatively high SNR, but not having the desired selectivity. The weights in adder 16 are usually all positive for maximum SNR. Signal 17 is high pass filtered in a two-dimensional filter to provide signal 19. Signals 19 and 15 are then combined based on the equation $$\hat{S} = S_l + CM_h$$

where $\hat{S}$ is the estimate of the desired selective signal, $S_l$ is the low passed selective signal 15 and $M_h$ is the high-passed low noise signal 19.

C is the control function which represents the factor which determines the amount and polarity of high frequency information added. In the prior art this control function was the ratio of the derivatives $\dot{S}_l/\dot{M}_l$. This gave weak signal problems where the quotient could blow up, requiring threshold circuits. The control function is developed in controller 21 where control signal 24 is applied to control gain structure 20 which varies the amplification of $M_h$.

A preferred embodiment of controller 21 is shown in FIG. 2. This controller is based on minimizing the error between the estimated signal $\hat{S}$ and the signal. The high frequency portion of the estimated signal is $CM_h$ while the original noisy high frequency signal is $S_h$. One approach to minimizing the error, in the high frequency region, is minimizing the function $$e = |S_h - CM_h|$$

over a region. A simple method of accomplishing this is to minimize $(S_h - CM_h)^2$ or the function raised to any even power. Setting $(S_h - CM_h)^2$ equal to zero over some region we obtain $$C = \Sigma S_h M_h / \Sigma M_h^2$$

where the summations are taken over an array of pixels surrounding the pixel of interest, such as a $5 \times 5$ array. This is, in effect the quotient of the cross correlation of $S_h$ and $M_h$, divided by the autocorrelation of $M_h$, all evaluated at one position, in the vicinity of the pixel of interest.

The processor for accomplishing this control function is shown in FIG. 2. The selective signal 13 is applied to two-dimensional high pass filter 18 to provide signal 30 the high frequency image signal $S_h$. This signal is multiplied by signal 19, the high frequency image signal $M_h$ of the low noise image M, in multiplier 31. This multiplication takes place for each of an array of pixels, such as a $5 \times 5$ array, surrounding each pixel of interest. All of these processed signals are added in summation structure 33 to form summed signal 34 representing $\Sigma S_h M_h$.

Similarly $M_h$, signal 19 components are squared in squaring structure 35 to form signal 36, the square of each pixel. An array of such pixels are summed in 37 to form summed signal 38 representing $\Sigma M_h^2$. Summed signals 34 and 38 are divided in divider 39 to form quotient 24 representing the desired estimate of C, the control function. Signal 24 controls the gain of controlled gain structure 20 to add the correct high frequency signal $CM_h$ to $S_l$ in 22 to form $\hat{S}$ the desired estimate of the image 23.

In many cases the image $\hat{S}$ is the desired processed image. In other cases a variety of processed images are desired from the measurements. Rather than do the extensive processing for each desired processed image, two or more basis images can be formed, each processed for high SNR. These are then combined to provide any desired combination. Since each component is low noise, the combination will generally have low noise.

This is illustrated in FIG. 3 where the low noise M signal is combined with the processed low noise $\hat{S}$ signal in processor 40. In the illustration 40 is a linear summation device providing an output 41 equal to $aM + b\hat{S}$ where a and b can be of either polarity. Thus a and b can determine which material is to be cancelled or enhanced, with all resultant combination having high SNR since the basis images $\hat{S}$ and M have high SNR.

For image fidelity it is best of filters 14 and 18 be complementary, that is, they each provide portions of the spectrum. If $L(u,v)$ is the normalized transfer characteristic of low pass filter 14 and $M(u,v)$ is the normalized transfer characteristic of 18, where u and v are the two-dimensional spectral frequency variables, then we prefer that $$L(u,v) + H(u,v) = 1$$

thus providing a flat spectrum. In object space this corresponds to $$l(x,y) + h(x,y) = \delta(x,y)$$

where $l(x,y)$ is the impulse response of the low-pass filter, $h(x,y)$ is the impulse response of the high-pass filter and $\delta(x,y)$ is a delta function.

In broad areas, in the absence of any high frequency signals, it is desirable for the noise to be relatively low. This will be the case if signals 13 and 19, $S_h$ and $M_h$, have orthogonal noise components. The cross correlation $\Sigma S_h M_h$ will then be relatively low. It is therefore desirable for $S_h$ and $M_h$ to have relatively uncorrelated noise. This can be accomplished through the choice of weights in summing structures 10 and 16. If, as in dual-energy systems, the preprocessed measurement signals 11 and 12 are negatively correlated. Then the weights of 10 and 16 can be chosen to represent uncorrelated S and M signals.

What is claimed is:

1. In a method for forming a selective image of improved signal-to-noise ratio from an array of measurements the steps of:
    forming a first combination of the measurements to provide a selective image signal;
    low-pass filtering the selective image signal to form a low frequency image signal;
    forming a high-pass filtered second comgination of the measurements to provide a low noise high frequency image signal; and
    combining the low frequency image signal with a controlled amount of the high frequency image signal to form an improved selective image with the control adjusted to minimize the average error between the improved selective image and the selective image and to minimize the squared error between the high frequency portions of the selective image and the improved image.

2. The method as recited in claim 1 where the step of minimizing the squared error includes the step of multiplying the high frequency image by the quotient of the cross-correlation of the high frequency portions of the selective image and the low noise, high frequency image and the autocorrelation of the low-noise high frequency image.

3. Apparatus for forming a selective image of improved signal-to-noise ratio from an array of measurements comprising:
    means for providing a first combination of the measurements to provide a selective image;
    means for providing a low-pass filtered selective image;
    means for providing a second combination of the measurements to provide a low-noise image;
    means for providing a high-pass filtered low-noise image; and
    means for combining the low-pass filtered selective image with a controlled amount of the high-pass filtered low-noise image to form an improved selective image with the control determined by minimizing the error between the selective image and the improved selective image and minimizing the squared error between the high frequency portions of the selective image and the improved selective image.

4. Apparatus as recited in claim 3 where the selective image is a projection image of a volume and the measurements are projection measurements of different components of the volume.

5. Apparatus as recited in claim 3 where the selective image is a cross-sectional image of a volume.

6. Apparatus as recited in claim 3 where the means for minimizing the squared error includes means for multiplying the high frequency image by the quotient of the cross correlation of the high frequency portions of the selective image and the low noise image and the autocorrelation of the low noise high frequency image.

7. Apparatus as recited in claim 6 where the cross correlation and autocorrelation are formed using a square group of picture elements surrounding the picture element being processed.

8. Apparatus as recited in claim 3 including means for forming a plurality of selective images.

9. Apparatus as recited in claim 8 where the plurality of selective images are used as basis images which are subsequently combined to enhance or eliminate specific materials.

10. Apparatus as recited in claim 3 where the measurements used to process the selective image are chosen so as to provide zero added high-pass filtered signal in the absence of signals whereby the background noise is minimized.

11. Apparatus as recited in claim 3 where the noise components of the selective image and the low-noise image are orthogonal.

12. Apparatus as recited in claim 3 where the low-pass filter and high-pass filter are complimentary.

* * * * *